(12) United States Patent
Chowdhry et al.

(10) Patent No.: US 8,901,237 B2
(45) Date of Patent: Dec. 2, 2014

(54) METHOD TO INCREASE RESISTANCE AGAINST STAIN PENETRATION OF AQUEOUS COATING COMPOSITIONS

(75) Inventors: Mubarik Mahmood Chowdhry, Singapore (SG); Hideki Yamashita, Mie-gun (JP); Cheeseng Yong, Shanghai (CN); Gregory John Catterall, Essendon North (AU); Jonathon Shane Allen, Melbourne (AU); Roger Jan Van Sonsbeek, Melbourne (AU); David Redfern, Melbourne (AU); Bernhard Schuler, Mannheim (DE); Oliver Wagner, Osthofen (DE); David Christie, Balgownie (AU)

(73) Assignee: BASF Aktiengesellschaft, Ludwigshafen (DE)

( * ) Notice: Subject to any disclaimer, the term of this patent is extended or adjusted under 35 U.S.C. 154(b) by 1267 days.

(21) Appl. No.: 12/066,155

(22) PCT Filed: Sep. 11, 2006

(86) PCT No.: PCT/EP2006/066215
§ 371 (c)(1),
(2), (4) Date: Mar. 7, 2008

(87) PCT Pub. No.: WO2007/031480
PCT Pub. Date: Mar. 22, 2007

(65) Prior Publication Data
US 2008/0245259 A1    Oct. 9, 2008

(30) Foreign Application Priority Data

Sep. 12, 2005 (EP) .................................... 05019802

(51) Int. Cl.
| C08L 31/00 | (2006.01) |
| C08L 31/02 | (2006.01) |
| C08L 33/00 | (2006.01) |
| C08L 33/02 | (2006.01) |
| C09D 7/12 | (2006.01) |
| C09D 135/06 | (2006.01) |
| C09D 133/08 | (2006.01) |
| C09D 133/12 | (2006.01) |
| C08K 5/41 | (2006.01) |
| C08K 5/521 | (2006.01) |

(52) U.S. Cl.
CPC ............ *C09D 7/1208* (2013.01); *C09D 135/06* (2013.01); *C08K 5/41* (2013.01); *C09D 133/08* (2013.01); *C08K 5/521* (2013.01); *C09D 133/12* (2013.01)
USPC ........ 524/556; 427/385.5; 524/140; 524/555; 524/558; 524/560; 524/561; 524/562

(58) Field of Classification Search
USPC ......... 524/140, 156, 556, 560, 555, 558, 561, 524/562; 427/385.5
See application file for complete search history.

(56) References Cited

U.S. PATENT DOCUMENTS

| 3,261,797 A | * | 7/1966 | Werner, Jr et al. ............ 524/428 |
| 3,993,843 A | * | 11/1976 | Vasta ............................. 428/422 |
| 4,021,395 A | * | 5/1977 | Vary ............................. 524/609 |
| 6,093,497 A | * | 7/2000 | Wiemann et al. ............. 428/500 |
| 6,129,989 A | * | 10/2000 | Sapper .......................... 428/500 |
| 6,248,826 B1 | * | 6/2001 | Solomon et al. ............. 524/556 |
| 6,348,528 B1 | | 2/2002 | Schlarb et al. |
| 6,395,827 B1 | * | 5/2002 | Pears et al. ....................... 525/55 |
| 6,451,899 B1 | * | 9/2002 | Zhao et al. .................... 524/501 |
| 2008/0095989 A1 | * | 4/2008 | Eubanks et al. .............. 428/192 |

FOREIGN PATENT DOCUMENTS

| EP | 0 614 955 | 9/1994 |
| JP | 2004 300211 | 10/2004 |
| WO | 98 10026 | 3/1998 |
| WO | 99 46337 | 9/1999 |
| WO | 2005 042642 | 5/2005 |

OTHER PUBLICATIONS

Ullmanns Encyklopaedie Der Technischen Chemie, $4^{th}$ Ed., vol. 15, p. 667-668.
Ullmanns Encyklopaedie Der Technischen Chemie, 15 Feb., 1984, $4^{th}$ Ed., vol. 15, p. 667-668.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

The invention also relates to a method to increase stain resistance and penetration resistance of aqueous coating compositions which method comprises providing a coating composition which contain at least one pigment, at least one film-forming polymer in the form of an aqueous polymer dispersion and at least one anionic surfactant, wherein the anionic surfactant comprises at least 85% by weight, preferably at least 90% by weight, more preferably at least 95% by weight, based on the total weight of anionic surfactant in the coating composition, of at least one anionic surfactant S, which is selected from semi-esters of sulfuric acid or phosphoric acid with an alcohol, which alcohol carries at least one alkyl radical having from 8 to 30 carbon atoms or an alkyl substituted phenyl radical wherein alkyl has from 4 to 30 carbon atoms and which alcohol may carry an oligo-$C_2$-$C_3$-alkylene-ether group provided that the number of repeating units in the oligo-$C_2$-$C_3$-alkylene-ether group is at most 15, or a salt thereof.

9 Claims, No Drawings

METHOD TO INCREASE RESISTANCE AGAINST STAIN PENETRATION OF AQUEOUS COATING COMPOSITIONS

The present invention relates to a method for improving staining properties of aqueous coating compositions.

For reasons of environmental protection and occupational hygiene, modern coating compositions such as emulsion paints and architectural or decorative coatings, for example, contain a binder formulation based on an aqueous polymer dispersion or an aqueous polymer latex, respectively. The polymer particles present in the polymer dispersion coalesce on drying thereby binding any pigment particles and fillers present and forming the coating. The formation of a uniform polymeric film and thus stable coating is only ensured, however, when the coating composition is processed at a temperature which lies above the minimum film-forming temperature of the polymer in the binder formulation. If the film formation is hindered the resulting coatings have only poor mechanical strength and thus poor scrub and wash resistance. This problem becomes more pronounced at high pigment to binder ratios in particular for coating compositions having a pigment volume concentration pvc ≥50 % or even pvc ≥60%. The pigment volume concentration PVC, here and below, is 100 times the ratio of the total volume of pigments plus fillers divided by the total volume of pigments, fillers and binder polymers; cf. Ullmanns Enzyklopädie d. Techn. Chem., 4th ed., vol. 15, p. 667.

A low minimum film-forming temperature is ensured in principle when using binders whose polymers have a low glass transition temperature. However, these binders have the disadvantage that the polymer film remains soft and is tacky. This, in turn, has the consequences for the coating of low blocking resistance, high soiling tendency and poor wash and burnish resistance. Alternatively, the minimum film-forming temperature of a polymeric binder may be lowered by processing it with film-forming auxiliaries (coalescents). These are volatile organic compounds, examples being solvents or plasticizers, which when the coating is dried facilitate film formation, initially, and on further drying are emitted to the environment, thereby increasing the surface hardness of the polymer film and reducing its tackiness. Volatile coalescents, however, entail an unwanted burden on the environment.

Another problem associated with aqueous coating compositions is the low resistance of the obtained coatings against penetration by and difficulty of removal of aqueous stains such as coffee, red wine, aqueous inks, and the like. It is assumed that the pigments in the coatings faciliate the penetration of the aqueous stains into the coatings, so that the stains can not be removed any longer. Most commercial paints have only poor stain resistance.

Further it is known that paints with poor wash (washing surface with sponge and soap solution), scrub (scrubbing surface with sponge, scourer or brush and a soap or scrubbing solution containing abrasives) or burnish resistance (polishing the surface with a dry sponge, cloth, brush or surface) show good stain resistance, however as the paint film is damaged in this process, indicated by a visually perceivable increase in gloss or erosion of the film, the performance is not acceptable to the consumer. This is because the cleaned area is different to the uncleaned area of the coating, highlighting it.

WO 98/10026 suggests to improve stain removal of waterborne coating compositions by choosing a anionically stabilized polymer dispersion as a binder, which polymer comprises acrylic acid or methacrylic acid, at least one vinylaromatic monomer and at least one C2-12 acrylic ester.

EP-A 614 955 refers to a stain resistant latex paint comprising a styrene containing copolymer latex having a glass transition temperature of greater than 21° C. and less than 95° C., a hiding pigment and a non-cellulosic thickener.

WO99/46337 describes an aqueous polymer dispersion containing an emulsifier with phosphate groups, however it focuses on corrosion and block resistance of the coatings and does not investigate the effect on stain resistance.

There is an ongoing need for pigment containing aqueous coating compositions which have good staining properties, in particular good staining resistance and penetration resistance against stains, and which also ensure uniform film formation at low concentrations of coalescence auxiliaries.

It has surprisingly been found by the inventors of the present application, that these and other objects could be solved by pigment containing aqueous coating compositions based on polymer latex binders comprising at least one anionic surfactant, which comprises at least 85% by weight, preferably at least 90% by weight, more preferably at least 95% by weight, based on the total weight of anionic surfactant in the coating composition, of at least one specific surfactants S as defined herein below. In particular the surfactants S should contain no or only small oligo-$C_2$-$C_3$-alkyleneether groups having at most 15 $C_2$-$C_3$-alkylene oxide repeating units in the oligo-$C_2$-$C_3$-alkylene-ether group.

Thus, the present invention relates to the use of such a coating composition for improving (or increasing) staining resistance and penetration resistance. The invention also relates to a method for improving (or increasing) stain resistance and penetration resistance of aqueous coating compositions which method comprises providing a coating composition which contain at least one pigment, at least one film-forming polymer in the form of an aqueous polymer dispersion and at least one anionic surfactant, wherein the anionic surfactant comprises at least 85% by weight, preferably at least 90% by weight, more preferably at least 95% by weight, based on the total weight of anionic surfactant in the coating composition, of at least one anionic surfactant S, which is selected from semi-esters of sulfuric acid or phosphoric acid with an alcohol, which alcohol carries at least one alkyl radical having from 8 to 30 carbon atoms or an alkyl substituted phenyl radical wherein alkyl has from 4 to 30 carbon atoms and which alcohol may carry an oligo-$C_2$-$C_3$-alkylene-ether group provided that the number of repeating units in the oligo-$C_2$-$C_3$-alkylene-ether group is at most 15, or a salt thereof.

The term "stain resistance" is understood as the ability of the coating to reduce staining when getting into contact with stains, in particular with liquid stains and more preferably aqueous stains such as ink, coloured beverage such as red wine, juice, coffee, tee and the like. The term "penetration resistance" is understood as the ability of the coating to reduce or prevent penetration of stains, in particular liquid stains more preferably aqueous stains into the coating. A skilled person will thus understand the terms "improving stain resistance" and "improving penetration resistance" as an increase in these properties, i.e. as a reduction of staining and a reduction of penetration of stains into the coating, respectively.

The use of surfactants S instead of conventional surfactants improve the staining properties of the pigment containing coatings, which are obtained, when a pigment containing coating composition as defined above, is applied to a substrate to be coated and dried. In particular, they reduce the penetration of hydrophilic liquid stains into the dry coating. Moreover, the incorporation of the surfactant S does not noticeably affect adversely the stability of the coating, i.e. the wash, scrub or burnishing resistance of the coating.

Suitable anionic surfactants S comprise at least one alkyl radical having from 8 to 30 carbon atoms, in particular from 10 to 25 carbon atoms and more preferably from 12 to 24 carbon atoms and most preferably from 14 to 22 carbon atoms or at least one alkylphenyl radical having from 4 to 30, in particular from 6 to 25 carbon atoms in the alkyl moiety. The alkyl radicals may be linear or branched and may be saturated or may contain 1, 2 or 3 ethylenically unsaturated double bonds. Preferably, the aliphatic radical is an alkyl radical which is linear or has at most one branching unit. Preferred aliphatic radicals are saturated, i.e. they do not contain double bonds. The aliphatic radical may be directly linked to the anionic group or via a spacer, e.g. by a phenyl group or by an oligo-$C_2$-$C_3$-alkylene ether group, provided that the number of $C_2$-$C_3$-alkylene oxide repeating units in the oligo-$C_2$-$C_3$-alkylene ether group does not exceed 15, in particular 12 and more preferably 10. In a particular preferred embodiment the number of alkylene oxide repeating units is from 2 to 15, in particular from 2 to 12 more preferably from 2 to 10. It might be advantageous to use a surfactant S, wherein the number of alkylene oxide repeating units is from 0 to 8, in particular from 0 to 5, e.g. 0 or 1 or from 2 to 8 or from 2 to 5. However, it might also be advantageous, if the number of alkylene oxide repeating units is from 5 to 12 or from 5 to 10.

Examples of suitable aliphatic radicals comprise n-octyl, 1-methylheptyl, 2-methylheptyl, 2-ethylhexyl, n-nonyl, 1-methyloctyl, n-decyl, 2-propylheptyl, n-undecyl, 1-methyldecyl, lauryl, 1-tridecyl, 1-methyldodecyl (isotridecyl), 1-tetradecyl, 1-pentadecyl, 1-hexadecyl (cetyl), 1-octadecyl (stearyl), 9-octadecen-1-yl (oleyl), linoleyl, linolenyl, 1-nonadecyl, 1-eicosyl, 1-heneicosyl, 1-docosyl, 13-docosen-1-yl, lignoceryl, ceryl and myricyl.

The anionic group in the surfactant S may be a sulfate ($SO_4$) group or a phosphate ($PO_4$) group which may be in the acid form or preferably in the neutralized (i.e. anionic) form.

In case the anionic group of the surfactant S is present in the neutralized form the anionic surfactant comprises cations as counter ions. Suitable cations comprise in particular the alkali metal ions, such as lithium, sodium and/or potassium, and ammonium ($NH_4^+$) with preference given to sodium and potassium.

Suitable surfactant salts of the sulfated type include sodium and or potassium. They are widely commercially available under a range of tradenames including but not limited to Gardinol®, Texapon®, Disponil® (Cognis), Lutensit® (BASF) Emulan®, Lutensol® (BASF AG), Maranil®, Sulfopon, and include surfactants with various levels of alkylene ether groups and aliphatic radicals as described above.

Suitable surfactants of the phosphated type are usually monoesters or diesters of phosphoric acid with the respective alcohol. They might be pure monoester or diester or mixtures of the mono- and diester, optionally with non-reacted alcohol. Preferably the anionic phosphate ester comprises the monoester as a major constituent. Most commercial phosphate esters are, however, mixtures of mono- and diesters and unreacted alcohol. Anionic phosphate esters are principally known in the art and they can be obtained commercially, e.g. under the trade marks ALKANATE® and TERIC® (from Huntsman Corporation company), ORISURF® (Sino-Japan Chemical Company), Maphos®, Lutensit® (from BASF AG), Hydropalat (Cogins), Rhodafac® (Rhodia).

Generally, the surfactant S is non-polymerizable, i.e. the surfactant S does not contain ethylenically unsaturated double bonds.

Preferred anionic surfactants S are those, wherein the anionic surfactant is of the formulae Ia or Ib:

  (Ia)

  (Ib)

wherein n is 1 or 2, in particular 1 to 1.5;

m is an integer from 0 to 15, in particular from 0 to 12 in particular from 0 to 10.

M is selected from the group consisting of hydrogen, alkali metal ions or an ammonium ion, in particular sodium or potassium;

Alk is $C_2$-$C_3$-alkylene and

R is selected from $C_8$-$C_{30}$ alkyl, preferably $C_{10}$-$C_{25}$ alkyl, more preferably $C_{12}$-$C_{24}$ alkyl in particular $C_{14}$-$C_{22}$ alkyl, and $C_6$-$C_{30}$ alkylphenyl. More preferably R is $C_8$-$C_{30}$ alkyl, preferably $C_{10}$-$C_{25}$ alkyl, more preferably $C_{12}$-$C_{24}$ alkyl in particular $C_{14}$-$C_{22}$ alkyl.

A skilled person will appreciate that the above given formula I comprises individual compounds as well as mixtures thereof, wherein the given n and m are average values.

$C_p$-$C_q$ alkyl as used herein refers to a saturated aliphatic radical having from p to q carbon atoms. Examples of $C_6$-$C_{30}$ alkyl comprise n-hexyl, n-octyl, 1-methylheptyl, 2-methylheptyl, 2-ethylhexyl, n-nonyl, 1-methyloctyl, n-decyl, 2-propylheptyl, n-undecyl, 1-methyldecyl, lauryl, 1-tridecyl, 1-methyldodecyl (isotridecyl), 1-tetradecyl, 1-pentadecyl, 1-hexadecyl (cetyl), 1-octadecyl (stearyl), 1-nonadecyl, 1-eicosyl, 1-heneicosyl, 1-docosyl, lignoceryl, ceryl and myricyl.

$C_r$-$C_s$ alkyl phenyl as used herein refers to a phenyl radical, which carries 1 or 2, preferably 1 saturated aliphatic radical having from r to s carbon atoms. Examples are octylphenyl, n-nonylphenyl, n-decylphenyl, n-dodecylphenyl and the like.

A preferred embodiment of the invention relates to the use of surfactants of the formulae Ia or Ib, wherein m is from 0 to 15, in particular from 0 to 12 and more preferably from 0 to 10 and the groups Alk-O , if present, comprise at least 50% by weight, more preferably at least 80% by weight, based on the total weight of the groups Alk-O, groups of the formula $CH_2CH_2O$. In particular, all or nearly all of the group Alk-O, if present, are of the formula $CH_2CH_2O$. In a particularly preferred embodiment, m in formulae Ia or Ib is 0 or 1. In another preferred embodiment, m in formulae Ia or Ib is from 2 to 15, in particular from 2 to 12 and more preferably from 2 to 10 or from 2 to 8 or from 2 to 5. In another embodiment m in formulae Ia or Ib is from 5 to 12 or from 5 to 10.

In order to achieve the desired staining properties, the surfactant S is present in an effective amount, which is preferably from 0.1 to 4% by weight, in particular from 0.2 to 2% by weight, more preferably from 0.5 to 2% by weight based on the polymer binder in the coating.

The surfactant S can be incorporated in the coating composition at any stage of its preparation or into the binder. For example, the anionic surfactant S can be incorporated into the binder in the course of the preparation of the binder, i.e. in the polymerisation process, which is described below. The anionic surfactant S can also be incorporated into the binder after its preparation, which is preferred. The anionic surfactant S and the binder may also be incorporated separately into the coating composition.

According to the invention, the coating compositions contain a polymeric binder in the form of an aqueous polymer dispersion or polymer latex, respectively. Here and in the following, the terms polymer dispersion, polymer latex and polymer emulsion are synonyms and refer to aqueous dispersions of fine polymer particles which are dispersed in an aqueous phase. Polymer dispersions which are suitable as binders in waterborne coating compositions have been comprehensively described in the literature, e.g. by J. C. Padget, J. Coatings Technology, Vol 66, 839, 1994, pp 89-101; M. Schwartz, R. Baumstark "Waterbased Acrylates for Decorative Coatings" Curt R. Vincentz Verlag Hannover 2001.

The properties of the coating composition may also depend on the glass transition temperature (DSC, midpoint temperature, ASTM D 3418-82) of the copolymer S. If the glass transition temperature is too low, the coating is not very strong and tears when subjected to a mechanical load. If it is too high, the polymer no longer forms a film and the coating, consequently, is of reduced wet abrasion resistance. The glass transition temperature of the binder polymers preferably does not exceed 50° C., in particular 30° C. and more preferably 20° C. In general, however, the glass transition temperature is at least −10° C., in particular at least 0° C. It proves useful in this context that the glass transition temperature $T_g$ of the dispersed polymer can be estimated by means of the equation of Fox (T. G. Fox, Bull. Am. Phys. Soc. (Ser. II) 1, [1956] 123) based upon the monomer composition of the polymer and from the glass transition temperature of the homopolymers of those monomers forming the polmyer. The latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed., J. Wiley, New York 1989.

The polymeric binder is usually constructed from ethylenically unsaturated monomers M. In general, monomers M comprise from 80 to 99.9% by weight, in particular from 90 to 99.5% by weight and more preferably from 95 to 99% by weight, based on the total weight of monomers M, of monoethylenically unsaturated neutral monomers having a water solubility below 30 g/L at 25° C. and 1 bar. Additionally, the polymeric binder usually comprises at least one further monomer which is selected from monoethylenically unsaturated monomers, which are ionic and/or have a water solubility of at least 50 g/l at 25° C. and 1 bar. The amount of these monomers usually does not exceed 20% by weight and is in particular from 0.1 to 20% by weight, preferably from 0.5 to 10% by weight and more preferably from 1 to 5% by weight, based on the total weight of monomers M. Monomers M may further comprise polyethylenically unsaturated monomers and crosslinking monomers. The amount of these monomers usually does not exceed 5% by weight of the monomers M. In particular the amount of these monomers does not exceed 0.5% by weight.

Monoethylenically unsaturated neutral monomers M1 having a water solubility below 30 g/L include e.g. vinylaromatic monomers, such as styrene, a-methylstyrene, o-chlorostyrene or vinyltoluenes, the vinyl esters of aliphatic $C_2$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl pivalate, vinyl laurate, vinylversatates, vinyl stearate, and the esters of ethylenically unsaturated $C_3$-$C_8$ mono- or dicarboxylic acids with $C_1$-$C_{18}$-, preferably $C_1$-$C_{12}$- and, in particular, $C_1$-$C_8$-alkanols or $C_5$-$C_8$-cycloalkanols. Examples of suitable $C_1$-$C_{18}$-alkanols are methanol, ethanol, n-propanol, i-propanol, 1-butanol, 2-butanol, isobutanol, tert-butanol, n-hexanol, 2-ethylhexanol, lauryl alcohol and stearyl alcohol. Examples of suitable cyclolkanols are cyclopentanol and cyclohexanol. Particularly suitable esters are those of acrylic acid and methacrylic acid such as ethyl, isopropyl, n-butyl, isobutyl, 1-hexyl, tert-butyl and 2-ethylhexyl acrylate, and methyl, ethyl, isopropyl, n-butyl, isobutyl, 1-hexyl, tert-butyl and 2-ethylhexyl methacrylate. Also suitable are $C_4$-$C_8$ conjugated dienes, such as 1,3-butadiene, isoprene or chloroprene, α-olefins, such as ethylene, propene and isobutene, and vinyl chloride or vinylidene chloride. Amongst these, preference is given to the esters of acrylic acid with $C_2$-$C_{10}$ alkanols, in particular with $C_1$-$C_8$ alkanols, to vinylaromatic monomers, in particular styrene, and to esters of methacrylic acid with $C_1$-$C_4$ alkanols. In a preferred embodiment of the invention, the monomers M comprise as monomers M1 at least one ester of acrylic acid with $C_2$-$C_{10}$ alkanols and at least one ester of methacrylic acid with $C_1$-$C_4$ alkanols. In this embodiment, vinylaromatics such as styrene may be present or preferably absent. In a very preferred embodiment of the invention, the monomers M1 are selected from a mixture consisting of at least one ester of acrylic acid with a $C_2$-$C_{10}$ alkanol and at least one ester of methacrylic acid with a $C_1$-$C_4$ alkanol. In a further preferred embodiment of the invention, the monomers M1 are selected from a mixture consisting of at least one ester of acrylic acid with a $C_2$-$C_{10}$ alkanol and styrene. In a further preferred embodiment of the invention, the monomers M1 are selected from a mixture consisting of at least one ester of acrylic acid with a $C_2$-$C_{10}$ alkanol, styrene and an ester of a methaycrylic acid with a $C_1$-$C_4$ alkanol.

Suitable ionic monomers (monomers M2) include in particular monoethylenically unsatureated acids such as monoethylenically unsaturated $C_3$-$C_6$ monocarboxylic acids, e.g. acrylic acid, methacrylic acid, vinylacetic acid, monoethylenically unsaturated $C_4$-$C_8$ dicarboxylic acids such as maleic acid, fumaric acid, itaconic acid, monoethylenically unsaturated sulfonic acids, e.g. vinylsulfonic acid, styrene sulfonic acid, 2-acrylamido-2-methylpropane sulfonic acid, 2-acryloxyethane sulfonic acid, 2-methacrylamido-2-methylpropane sulfonic acid, 2-methacryloxyethane sulfonic acid and the salts thereof, in particular the alkalimetal salts and the ammonium salts thereof. In general, the amount of ionic monomers will not exceed 5% by weight, in particular 3% by weight, based on the total amount of monomers M. More preferably, the amount of ionic monomers M2 ranges from 0.1 to 3% by weight, more preferably from 0.2 to 2% by weight, based on the total weight of monomers M. In a very preferred embodiment, the polymeric binder comprises at least one ionic monomer M2 selected from itaconic acid, acrylic acid, methacrylic acid and from mixtures of itaconic acid with acrylic acid or methacrylic acid.

Suitable monoethylenically unsaturated monomers, which are neutral and which have a water solubility of at least 50 g/l (monomers M3) might be present in the polymeric binder in amounts up to 20% by weight, preferably up to 10% by weight and in particular up to 5% by weight, based on the total amount of monomers M. Preferably the total amount of monomers M2+M3 does not exceed 20% by weight, in particular 10% by weight, and more preferably 5% by weight, based on the total amount of monomers M.

Examples of monomers M3 include monomers M3a which are selected from the amides of monoethylenically unsaturated $C_3$-$C_6$ monocarboxylic acids, for example, the amides of acrylic acid and of methacrylic acid, the $C_2$-$C_4$ hydroxyalkyl esters of monoethylenically unsaturated $C_3$-$C_6$ monocarboxylic acids, for example, the 2-hydroxyethyl esters, the 2- or 3-hydroxypropyl esters, and the 2- or 4-hydroxybutyl esters of acrylic acid and of methacrylic acid, the esters of monoethylenically unsaturated $C_3$-$C_6$ carboxylic acids with polyalkylene glycols and their monoethers, especially the esters with polyethylene glycols and the esters with monoalkyl ethers of polyethylene glycols which are described e.g. in U.S. Pat. No. 5,610,225. Monomers M3a are usually present in amounts from 0 to 5% by weight, in particular 0.1 to 4%, by weight, more preferably 0.5 to 3% by weight, based on the total weight of monomers M. Monomers M3 also include monomers M3b which contain urea groups, examples being N-vinylurea and N-allylurea, and derivatives of imidazolidin-2-one, examples being N-vinyl- and N-allylimidazolidin-2-one, N-vinyloxyethylimidazolidin-2-one, N-(2-(meth)acrylamidoethyl)imidazolid in-2-one, N-(2-(meth)-acryloxyethyl)imidazolid in-2-one, N-[2-((meth)acryloxyacetamido)-ethyl]imidazolid in-2-one, etc. Preferably, the monomers M3b are used in an amount of at least 0.1% by weight, in particular in an amount of from 0.1 to 5% by weight, and with very particular preference in an amount of from 0.5 to 2% by weight, based on the total weight of the monomers M. Monomers M3 also include monomers M3c which are ethylenically unsaturated nitriles such as acrylonitrile and methacrylonitrile. Monomers M3c may be present in the polymer binder in amounts up to 20% by weight, preferably up to 10% by weight, based on the total amount of monomers M.

The monomers M may further include polyolefinically monomers, i.e. monomers having two or more nonconjugated double bonds (monomers M4), such as ethylene glycol diacrylate, 1,4-butanediol diacrylate, allyl acrylate and allyl methacrylate, trimethylolpropane triacrylate, and trimethylolpropane trimethacrylate. Polyolefinically unsaturated monomers may be used, if desired, in amounts <1% by weight, based on the total weight of all the monomers M.

The monomers M may further include those monomers which in addition to an ethylenically unsaturated double bond have a reactive functional group (monomers M5), e.g., an aldehyde group, a keto group, a siloxane group or an oxirane group. Functional groups of this kind lead to crosslinking in the course of film formation or may be crosslinked with the aid of a crosslinker during film formation. Examples of monomers M5 are acrolein, methacrolein, diacetoneacrylamide and diacetonemethacrylamide, vinyl acetoacetate or the esters of acetoacetic acid with hydroxyalkyl acrylates and hydroxyalkyl methacrylates, examples being 2-acetoacetoxyethyl acrylate and 2-acetoacetoxyethyl methacrylate, and also glycidyl esters of ethylenically unsaturated carboxylic acids, such as glycidyl acrylate and glycidyl methacrylate. Additional crosslinkers that are suitable include nonvolatile polyamine compounds having two or more reactive amino groups. Examples of these are oxalic dihydrazide, malonic dihydrazide, and adipic dihydrazide.

Preferably monomers M do not comprise more than 0.5% by weight of monomers other than monomers M1, M2 and M3.

In a preferred embodiment of the invention the binder polymers comprise
- from 20 to 65%, in particular from 30 to 54.9% by weight based on total monomer M of at least one monomer M1a, selected from vinylaromatic monomers and $C_1$-$C_4$ alkyl esters of methacrylic acid in particular methyl methacrylate, with $C_1$-$C_4$ alkyl esters of methacrylic acid latter being preferred,
- from 35 to 79.9% by weight, in particular from 35 to 69.5% by weight of at least one monomer M1b whose homopolymer has a glass transition temperature of below 10° C., selected from the $C_2$-$C_{10}$ alkyl esters of acrylic acid and the $C_5$-$C_{18}$ alkyl esters of methacrylic acid, with preference given to $C_2$-$C_{10}$ alkyl esters of acrylic acid, in particular ethyl acrylate, n-butyl acrylate and 2-ethylhexyl acrylate;
- from 0 to 5% by weight, e.g. from 0.1 to 5% by weight, in particular from 0.1 to 3% by weight and more preferably from 0.2 to 2% by weight, of one or more monoethylenically unsaturated acids as monomer M2,
- from 0 to 5% by weight, e.g. 0.1 to 5% by weight, in particular from 0.1 to 4% by weight and more preferably from 0.5 to 3% by weight, of one or more monomers M3a selected from the group consisting of amides, $C_1$-$C_4$ hydroxyalkyl esters and $C_1$-$C_4$ alkyl polyalkylene oxide esters of monoethylenically unsaturated $C_3$-$C_6$ monocarboxylic acids; and/or
- from 0 to 5% by weight, e.g. 0.1 to 5% by weight, in particular from 0.5 to 2% of one or more monoethylenically unsaturated monomers M3b containing an urea group; and
- from 0 to 20% by weight, preferably 0 to 10% by weight of one or more monomers M3c, selected from acrylonitrile and methacrylonitrile, provided that the total amount of monomers M1a, M1b, M2, M3a, M3b and M3c is 100% by weight, and the total amount of monomers M2, M3a and M3b is from 0.1 to 5% by weight, based on the total amount of monomers M1a, M1b, M2, M3a, M3b and M3c.

Preferably the amount of monomers M2 is from 0.1 to 3% by weight, in particular from 0.2 to 2% by weight and the total amount of monomers M3a and M3b is from 0.1 to 5% by weight, in particular from 0.5 to 3% by weight, based on the total amount of monomers M.

In a very preferred embodiment, monomers M1a comprise 2-ethylhexyl acrylate or a mixture of 2-ethylhexylacrylate and a further $C_2$-$C_{10}$ alkyl ester of acrylic acid different therefrom such as n-butyl acrylate.

With very particular preference, the binder polymers comprise:
- from 40 to 59.4% by weight of at least one monmer M1a, which is in particular methyl methacrylate or a mixture thereof with styrene;
- from 40 to 55% by weight, of at least one monomers M1b, which is in particular selected from n-butyl acrylate and 2-ethylhexyl acrylate;
- from 0.1 to 3% by weight, in particular from 0.2 to 2% by weight of at least one monomer M2, which is in particular selected from itaconic acid, acrylic acid, methacrylic acid, and mixtures thereof;
- from 0.5 to 3% by weight, in particular from 1 to 2% by weight, of at least one monomer M3a, in particular acrylamide, methacrylamid and/or hydroxyethyl acrylate, and/or
- from 0 to 2% by weight (if desired, e.g., from 0.1 to 2% by weight) of at least one monomer M3b e.g. N-(2-methacryloxyethyl)imidazolin-2-one.

the total amount of monomers M1a, M1b, M2, M3a, M3b and M3c being 100% by weight and the total amount of monomers M2, M3a and M3b being from 0.7 to 5% by weight.

In accordance with the invention, it has proven advantageous if the polymer particles of the binder polymer in the aqueous dispersion have a weight-average polymer particle diameter of less than 500 nm, preferably in the range from 50 to 300 nm, and with particular preference in the range from 80 to 200 nm (determined by means of an ultracentrifuge or by photon correlation spectroscopy; on particle size determination using an ultracentrifuge see, e.g., W. Mächtle, Makromolekulare Chemie, 1984, vol. 185, 1025-1039; W. Mächtle, Angew. Makromolekulare Chemie, 162, 1988, 35-42).

The aqueous dispersions of the binder polymer are usually prepared by free-radical aqueous emulsion polymerization of the aforementioned monomers M in the presence of at least one free-radical polymerization initiator and of at least one surface-active substance.

Suitable surface active substances for this purpose comprise emulsifiers and protective colloids. Preferably the polymer dispersions which are used as binders are prepared in the presence of at least one emulsifier. Appropriate emulsifiers which are commonly used for such purposes can be found e.g. in Houben-Weyl, Methoden der organischen Chemie, volume XIV/1, Makromolekulare Stoffe [Macromolecular Substances], GeorgThieme-Verlag, Stuttgart, 1961, pp. 192-208, and in M. Schwartz, R. Baumstark. loc. cit.

In general, the polymer dispersion that is used as a polymer binder is prepared in the presence of at least one anionic emulsifier. Suitable anionic emulsifiers include alkali metal salts and ammonium salts, especially the sodium salts, of alkyl sulfates (alkyl: $C_8$-$C_{20}$), of sulfuric acid monoesters with ethoxylated alkanols (EO units: 0 to 12, alkyl: $C_{10}$-$C_{20}$), and of alkylsulfonic acids (alkyl: $C_{10}$-$C_{20}$), mono- and di-($C_4$-$C_{16}$ alkyl)diphenyl ether disulfonates and mono- and dialkyl esters of phosphates (alkyl: $C_8$-$C_{20}$), and phosphoric acid monoesters and diesters with ethoxylated alkanols (EO units: 0 to 12, alkyl: $C_{10}$-$C_{20}$).

In a preferred embodiment of the invention, the anionic emulsifier, which is used in the preparation of the polymer dispersion comprises at least one anionic emulsifier which is different from the anionic surfactants S. In particular, the anionic emulsifier is absent in the preparation of the aqueous polymer dispersion. However, a mixture of a surfactant S and at least one further anionic emulsifier different therefrom may be used in the preparation of the polymer dispersion. In these mixtures the weight ratio of surfactant S and the further anionic emulsifier is from 1:3 to 3:1.

In another embodiment the surfactant S is the only anionic emulsifier, which is used for the preparation of the aqueous polymer dispersion.

The total amount of anionic emulsifier which is present in the preparation of the aqueous polymer dispersion is preferably from 0.1 to 5%, in particular from 0.2 to 3% by weight, based on the total amount of monomers M.

A non-ionic emulsifier may also be present, when the aqueous polymer dispersion is prepared. Suitable nonionic emulsifiers comprise aliphatic nonionic emulsifiers, examples being ethoxylated long-chain alcohols (EO units: 3 to 50, alkyl: $C_8$-$C_{36}$) and polyethylene oxide/polypropylene oxide block copolymers. Preference is given to ethoxylates of long-chain alkanols (alkyl: $C_{10}$-$C_{22}$, average degree of ethoxylation: from 3 to 50) and, of these, particular preference to those based on naturally occurring alcohols or oxo alcohols having a linear or branched $C_{12}$-$C_{18}$ alkyl radical and a degreee of ethoxylation of from 2 to 50. Particularly preferred nonionic emulsifiers are the ethoxylates of oxo alcohols having a branched $C_{10}$-$C_{16}$ alkyl radical and an average degree of ethoxylation in the range from 8 to 20, and also fatty alcohol ethoxylates having a linear $C_{14}$-$C_{18}$ alkyl radical and an average degree of ethoxylation in the range from 10 to 30. Nonionic emulsifiers are used normally in an amount of from 0.1 to 5% by weight, in particular from 0.3 to 3% by weight, and especially in the range from 0.5 to 2% by weight, based on the total weight of the monomers M.

Preferably, a non-ionic emulsifier is not present, when the aqueous polymer dispersion is prepared as this reduces the stain resistance for hydrophilic stains, however they may be used in the polymer dispersion or the final paint to improve tinting of the final paint.

Preferably, the total amount of anionic and nonionic emulsifier will not exceed 5% by weight, in particular 4% by weight, more preferably 3% by weight, based on the total weight of the monomers M, and in particular is in the range from 0.5 to 4% by weight or 0.5 to 3% by weight.

Examples of suitable protective colloids are polyvinyl alcohols, starch derivatives and cellulose derivatives and vinylpyrrolidone copolymers. A detailed description of further suitable protective colloids can be found in Houben-Weyl, Methoden der organischen Chemie, volume XIV/1, Makromolekulare Stoffe, Georg-Thieme-Verlag, Stuttgart 1961, pp. 411-420. In the preparation of the binder polymers of the invention it is preferred to use no protective colloids.

Preferably, the coating composition of the invention does not contain emulsifiers having an alkylphenyl radical such as alkylphenolsulfonates, sulfates or phosphates of alkoxylated alkylphenols or alkoxylated alkylphenols.

The emulsifiers remain in the polymer dispersion when it is formulated as a coating composition and thus will affect their properties. It has been proven advantageous, when the total amount of emulsifiers in the coating composition is from 0.1 to 7% by weight, in particular from 0.1 to 3% by weight, based on the total weight of the coating composition.

Suitable free-radical polymerization initiators are all those capable of triggering a free-radical aqueous emulsion polymerization. They may include both peroxides, such as alkali metal peroxodisulfates, and azo compounds. As polymerization initiators it is common to use what are known as redox initiators, which are composed of at least one organic reducing agent and at least one peroxide and/or hydroperoxide, an example being tert-butyl hydroperoxide with sulfur compounds, e.g., the sodium salt of hydroxymethanesulfinic acid, sodium sulfite, sodium disulfite, sodium thiosulfate, or acetone-bisulfite adduct, or hydrogen peroxide with ascorbic acid. Preferably, the amount of free radical initiator systems used, based on the total amount of the monomers for polymerization, is from 0.1 to 2% by weight.

The molecular weight of the polymers S may be adjusted by adding small amounts, generally up to 2% by weight, based on the monomers to be polymerized, of one or more molecular weight regulator substances into the polymerization reaction. Examples of chain regulating agents include organic thio compounds, such as mercaptoethanol, mercapto acetic acid, mercapto propionic acid, alkylmercaptanes such as dodecylmercaptanes, furthermore silanes such as allyldimethylsilane, mercaptopropyltrimethoxysilane, allyl alcohols, and aldehydes. With regard to the staining properties of the coating compositions it has been proven advantageous when the polymer dispersion is prepared in the presence of such a chain regulating agent. Preferably the amount of chain regulating agent is from 0.01 to 2% by weight, in particular from 0.05 to 1% by weight, based on the total weight of monomers M. The chain regulating agent can be added to the initial charge of the polymerization reactor in the course of the polymerization reaction, e.g. together with the monomers or separately.

The emulsion polymerization may take place either continuously or by the batch procedure, preferably by a semicontinuous process. In semicontinuous processes the majority, i.e., at least 70%, preferably at least 90%, of the monomers for polymerization is supplied continuously, including staged or gradient procedures, to the polymerization batch. This procedure is also referred to as the monomer feed technique. The term monomer feed (stream) refers to liquid monomer mixtures, monomer solutions or, in particular, aqueous monomer emulsions. In a preferred embodiment the major part, i.e. at least 80% of the monomers to be polymerized and optionally the chain regulating agent are added to the polymerization reaction in the course thereof.

In addition to the seed-free mode of preparation, it is possible for the purpose of establishing a defined polymer particle size to conduct the emulsion polymerization by the seed latex process or in the presence of seed latex prepared in situ. Processes for this purpose are known and can be found in the prior art (see EP-B 40419, EP-A-614 922, EP-A-567 812 and literature cited therein, and also 'Encyclopedia of Polymer Science and Technology', Vol. 5, John Wiley & Sons Inc., New York 1966, p. 847). The polymerization is preferably carried out in the presence of from 0.01 to 3% by weight, and in particular from 0.02 to 1.5% by weight, of a seed latex (solids content of the seed latex, based on total monomer amount), preferably with seed latex introduced initially (initial-charge seed). The seed latex may also be generated in situ from the monomers for polymerization by initially introducing a small amount of the monomers for polymerization in the form of an aqueous emulsion together with a portion of the surface-active substance, heating this emulsion to polymerization temperature, and then adding a portion of the initiator.

The pressure and temperature of polymerization are of minor importance. In general, it is carried out at temperatures between room temperature and 120° C., preferably at temperatures from 40 to 110° C., and with particular preference between 50 and 95° C.

Following the polymerization reaction proper it may be necessary to free the aqueous polymer dispersions of the invention substantially from odorous substances, such as residual monomers and other volatile organic constituents. This can be done conventionally by physical means, by distillative removal (especially by steam distillation) or by stripping with an inert gas. The reduction in the amount of residual monomers may also be effected chemically by means of free-radical postpolymerization, in particular under the action of redox initiator systems, as set out, for example, in DE-A-44 35 422, DE-A 44 35 423 or DE-A 44 19 518.

Before being used in the formulations of the invention, the aqueous dispersions of the binder polymers are preferably adjusted to a pH in the range from 6 to 10, preferably by addition of a nonvolatile base, e.g., alkali metal hydroxides or alkaline earth metal hydroxides, and volatile (for example ammonia) or nonvolatile amines. Nonvolatile amines are, for example, ethoxylated diamines or polyamines, examples being the products sold under the commercial designation Jeffamine (Texaco Chemical Co.). The aqueous polymer dispersions of the binder polymer obtained by the route of free-radical aqueous emulsion polymerization generally have solids contents in the range from 40 to 70% by weight. They can be used directly, without further processing, as binder formulations. Alternatively, they may be compounded with the additives customary for the application in question to form a binder formulation. Furthermore, they may contain one or more biocides, e.g., 3-isothiazolones, for the purpose of preventing microbial infestation. In general, following their deodorization, the binder formulations of the invention contain less than 1000 ppm, preferably less than 500 ppm, of volatile organic compounds such as solvents or unpolymerized monomers.

As mentioned above, the aqueous coating composition of the invention contains at least one pigment which may be a fine particulate organic or inorganic material. The term "fine particulate material" as used herein refers to any fine particulate non-film-forming organic or inorganic solids and includes any known pigments, extenders and fillers. Generally, the mean particle sizes of the fine particles range from about 0.01 to about 50 microns, in particular from 0.1 to 20 microns. Examples of suitable fine particulate inorganic material include $TiO_2$ (in both anatase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide, iron oxide and mixtures thereof. Suitable mixtures include blends of metal oxides such as those sold under the marks MINEX® (oxides of silicon, aluminum, sodium and potassium commercially available from Unimin Specialty Minerals), CELITES® (aluminum oxide and silicon dioxide commercially available from Celite Company), ATOMITES® (commercially available from English China Clay International), and ATTAGELS® (commercially available from Engelhard). More preferably, the fine particulate material includes at least one of the groups of $TiO_2$, $CaCO_3$ and clay. In a very preferred embodiment of the invention, the filler mainly consists of $TiO_2$ or of a mixture of $TiO_2$ with $CaCO_3$ and/or clay. The term "mainly consists of" is to be understood so that $TiO_2$ or the mixture of $TiO_2$ with $CaCO_3$ and/or clay, respectively, makes up at least 80% by weight, in particular at least 90% by weight, of the filler material present in the coating composition. $TiO_2$ particles used in the aqueous coating composition typically have a mean particle size of from about 0.15 to about 0.40 microns. Organic pigment material includes opaque polymer particles, for example Ropaque® commercially available from Rohm and Hass and organic pigments with examples including but not limited to pthalocyanine green commercially available as Heliogen Green from BASF. The fine particulate pigment material can be added to the aqueous coating composition as a powder or in slurry form.

The pigment material is preferably present in the aqueous coating composition in an amount of at least 2% by weight, preferably at least 10% by weight, in particular at least 20% by weight, the upper limit being about 60% by weight or 50% by weight, based on the total weight of the coating composition. The amount can be varied to adjust the gloss and opacity of the coating to the desired level. In general: the lower the level of fine particulate material, the higher the stain resistance of the coating.

The weight ratio of pigment material to polymeric binder (calculated as solids) is preferably from 10:1 to 1:8 in particular from 4:1 to 1:5. The improvement of the staining properties is best for coating compositions having a pvc (pigment volume concentration) of at least 20%, in particular from 25% to 45%. However, improvement can also be achieved for higher pvc.

The coating composition can optionally contain additives such as one or more film-forming aids or coalescing agents. Suitable film-forming aids or coalescing agents include plasticizers and drying retarders such as high boiling point polar solvents.

The composition may also contain anti-freeze agents and or humectants/open time extenders based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). Anti freeze agents and open time extenders may also work as filmforming aids, although being very inefficient.

In a preferred embodiment of the invention, the total amount of film-forming aids and volatile organic compounds, i.e. compounds having a boiling point below 250° C. at 1 atmosphere such as the aforementioned open time extenders and anti-freeze agents is below 6% by weight, in particular below 3% by weight.

Despite the fact that the aqueous coating compositions of the invention include little or no volatile agents, the compositions possess good coating properties such as good washing stability and low blocking.

Other conventional coating additives such as, for example, dispersants, additional surfactants (i.e. wetting agents), rheology modifiers, defoamers, thickeners, biocides, mildewcides, colorants such as coloured pigments and dyes, waxes, perfumes, cosolvents, and the like, can also be used in accordance with the invention. For example, non-ionic and/or ionic (e.g. anionic or cationic) surfactants can be used to produce the polymer latex. These additives are typically present in the aqueous coating composition in an amount from 0 to about 15% by weight, more preferably from about 1 to about 10% by weight based on the total weight of the coating composition. The additives discussed above can be added in any suitable order to the polymer dispersion, the pigment, or combinations thereof, to provide these additives in the aqueous coating composition. In the case of paint formulations, the aqueous coating composition preferably has a pH of from 7 to 10. In a preferred embodiment of the invention the pH is 7-8.5.

The balance of the aqueous coating composition of the invention is water. Although much of the water is present in the polymer latex dispersion and in other components of the aqueous coating composition, water is generally also added separately to the aqueous coating composition. Typically, the aqueous coating composition includes from about 10% to about 75% by weight and more preferably from about 30% to about 65% by weight water. Stated differently, the total solids content of the aqueous coating composition is typically from about 25% to about 90% by weight, more preferably, from about 35% to about 70%.

The coating compositions are typically formulated such that the dried coatings comprise at least 10% by volume of dry polymer solids, and additionally 10 to 90% by volume of non-polymeric solids in the form of pigments, fillers or extenders. The dried coatings can also include additives such as plasticizers, dispersants, surfactants, rheology modifiers, defoamers, thickeners, biocides, mildewcides, colorants, waxes, and the like, that do not evaporate upon drying of the coating composition.

The present invention further includes a method of preparing an aqueous coating composition by mixing together at least one polymer dispersion, at least one surfactant S as described above, and at least one pigment.

The aqueous coating compositions of the invention are stable fluids that can be applied to a wide variety of materials such as, for example, paper, wood, concrete, metal, gyprock or plasterboard, cement sheet, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

The present invention will now be further described by the following non-limiting examples.

EXAMPLES

General Method for Preparing Polymer Dispersions

Polymer dispersions were produced in glass lined reactors. A pre emulsion of monomers and surfactants was prepared and the reactor charged with small part of the monomers to be polymerized, about 1.2 pphm of seed latex and a small part of the surfactants used during polymerization. The reactor contents were heated to over 60° C. and the preemulsion of monomers and a solution of the initiator were fed into the reactor over a period of 3 hours. Temperature was maintained below 100° C. for the duration of the polymerization reaction, the contents were then cooled to 70° C. and chemical deodorisation commenced. After further cooling to below 50° C. the pH was adjusted to 7.0-8.5 and a commercial biocide was added.

Samples with post addition of surfactant S were prepared by addition of surfactant S under low speed mixing to the polymer dispersion. At the completion of addition of the surfactant S the polymer dispersion was stirred for a further 15 minutes before being filtered.

The monomer composition, the emulsifiers used and the properties of the obtained polymer dispersions are given in table 1:

Abbreviations used in table 1:
A: Sodium salt of the monoester of sulfuric acid with a $C_{12}/C_{14}$ alkyl ethoxylate having 30 ethylenoxide repeating units (EO units);
B: Sodium salt of the monoester of sulfuric acid with a $C_{12}/C_{14}$ alkyl ethoxylate having 2 EO units;
C: Sodium salt of the monoester of sulfuric acid with a $C_{12}/C_{14}$ alkanol (sodium lauryl sulfate);
D: Sodium salt of dodecylbenzene sulfonic acid;
E: free acid form of the monoester of phosphoric acid with $C_{12}/C_{14}$ alkyl ethoxylate having 9 EO units;
F: free acid form of a mixture of mono- and diester of phosphoric acid with nonylphenol ethoxylate having 4 EO units;
SCS: Sodium cetylsulfate.
MMA: methyl methacrylate
BA: n-butyl acrylate
EHA: 2-ethylhexyl acrylate
CT: tert. dodecylmercaptan
*: Sample prepared by post addition of emulsifier F or G
comp: Comparative
pphm: parts per hundred parts of monomers (parts by weight, or % by weight, based upon the total amount of monomers)
M2-M3: Stabilizing monomers (mixture of monoethylenically unsaturated acid, acrylamide and N-(2-methacryloxyethyl)imidazolin-2-one);
$D_{50}$: Weight average diameter of polymer particles, determined by photon correlation spectroscopy using a Malvern Autosizer device.

TABLE 1

| Dispersion | MMA [pphm] | BA [pphm] | 2EHA [pphm] | M2-M3 [pphm] | CT [pphm] | Emulsifiers [pphm] | | | | | | $TG^{1)}$ [° C.] | Solids [%-bw] | $D_{50}$ [nm] |
|---|---|---|---|---|---|---|---|---|---|---|---|---|---|---|
| | | | | | | A | B | C | E | F | G | | | |
| C1 (comp) | 50 | 46 | — | 4.0 | — | 0.22 | — | 0.2 | 0.5 | — | — | 19 | 50.3 | 153 |
| C2 | 54 | — | 42 | 4.0 | — | — | — | 0.4 | 0.5 | — | — | 13 | 50.3 | n.a. |
| C3 | 53 | — | 42 | 4.2 | 0.8 | — | — | 0.4 | 0.5 | — | — | 13 | 50.4 | 137 |
| C4 | 44 | — | 52 | 4.0 | — | — | — | 0.4 | 0.51 | 1.0 | — | −2 | 49.8 | 123 |
| C5 | 54 | — | 42 | 4.0 | — | — | — | 0.4 | 0.5 | 1.0 | — | 13 | 50.4 | 125 |
| C6* | 54 | — | 42 | 4.0 | — | — | — | 0.4 | 0.5 | — | 1.0 | n.a. | n.a. | n.a. |

TABLE 1-continued

| Dispersion | MMA [pphm] | BA [pphm] | 2EHA [pphm] | M2-M3 [pphm] | CT [pphm] | Emulsifiers [pphm] A | B | C | E | F | G | TG[1] [° C.] | Solids [%-bw] | $D_{50}$ [nm] |
|---|---|---|---|---|---|---|---|---|---|---|---|---|---|---|
| CD1 (comp) | 50 | 46 | — | 4.0 | — | 0.2 | — | 0.2 | 0.5 | — | — | 19 | 50.1 | 155 |
| CP (comp) | 50 | 46 | — | 4.0 | — | 0.2 | — | 0.2 | 0.5 | — | — | 19 | 50.0 | n.a. |
| CP+* (comp) | 50 | 46 | — | 4.0 | — | 0.2 | — | 0.2 | 0.5 | 1.0 | — | n.a. | n.a. | n.a. |
| D1 | 54 | — | 42 | 4.0 | — | — | — | — | — | 1.0 | — | 13 | 51.7 | 146 |
| D2 | 50 | 46 | — | 4.0 | — | — | 0.23 | 0.2 | 0.5 | — | — | 19 | 49.8 | 97 |
| D3 | 54 | — | 42 | 4.0 | — | — | 0.23 | 0.2 | 0.5 | — | — | 13 | 50.0 | 147 |
| D4 | 50 | 46 | — | 4.0 | — | — | 0.12 | 0.2 | 0.5 | — | — | 19 | 50.0 | 107 |
| D5 | 54 | — | 42 | 4.0 | — | — | — | 0.4 | 0.5 | — | — | 13 | 50.1 | 151 |
| D6 | 54 | — | 42 | 4.0 | — | — | — | 0.9 | — | — | — | 13 | 51.0 | 133 |
| D7 | 54 | — | 42 | 4.0 | — | — | — | 0.9 | — | — | — | 13 | 51.1 | 136 |

*SCS

II. Formulation of Paints

A paint millbase was manufactured from the ingredients given in table A using a high-speed disperser running at between 2000 to 2500 rpm for 30 minutes. After 30 minutes of high speed mixing, the dispersion was checked to be under 60 μm using a Hegman gauge.

TABLE A

Composition of Millbase

| Ingredients | Parts by Weight |
|---|---|
| Water | 70.2 |
| Propylene Glycol | 106.8 |
| Sokalan ® CP9[1)] | 27.5 |
| Acticide ® SPX[2)] | 2.0 |
| Acrysol ® SCT275[3)#] | 12.2 |
| Collacral ® 8990[4)] | 12.2 |
| Foammaster ® VL[5)] | 6.1 |
| Tiona RCL 575[6)] | 457.8 |
| Omyacarb ® 5[7)] | 137.3 |
| Omyacarb ® 10[8)] | 167.9 |
| | 1000 |

[1)]Dispersing agent from BASF Aktiengesellschaft
[2)]Biocide from Thor Chemicals
[3)]Polyurethanethickener from Rohm&Haas Co. Philadelphia, Pa, USA
[4)]Polyurethanethickener from BASF Aktiengesellschaft
[5)]Defoamer from Cognis
[6)]Titaniumdioxide, general purpose rutile grade, Millennium Inorganic Chemicals Company,
[7)]Calciumcarbonate filler, typical particle size 5 μm, Omya Australia
[8)]Calciumcarbonate filler, typical particle size 12 μm, Omya Australia
for paints 1c, 2, 3, and 4b Collacral ® LR 8989 polyurethane thickener from BASF Aktiengesellschaft was used in place of Acrysol SCT 275

Paints were then made up from the millbase by adding 53.9 parts of water to 477.6 parts of millbase and than adding thereto 300.3 parts of the aqueous polymer dispersion and then again 160.9 parts of water and 7.3 parts of coalescing agent (Dowanol DPnB, Dow Chemicals). The mixing of the ingredients was accomplished by using mixing paddles at low speed. After manufacture, all paints were stored overnight at 23° C. before testing commenced. Paints were not filtered prior to being tested.

The formulation for paint 4 was slightly modified due to the removal of coalescing agent, however the method of production was the same.

| | Paint 4 formula |
|---|---|
| Water | 27.36 |
| Sokolan CP9 | 4.52 |
| Acticide SPX | 0.33 |
| Aqualon ® NHS300[9)] | 4.01 |
| Foamaster VL | 1.00 |
| Tiona 595 | 75.22 |
| Omyacarb 10 | 40.12 |
| Miclay ® 63[10)] | 10.68 |
| Water | 13.27 |
| Latekoll ® BA904[11)] (15%) - 4.5% solids | 3.35 |
| Polymer | 103.30 |
| Water | 57.19 |
| Total paint | 344.49 |

[9)]Polyurethane thickener from Aqualon
[10)]micaceous clay topcut particle size 635 μm filler from Unimin Australia.
[11)]Acrylic thickener from BASF

III. Application Properties

III.1 Stain Resistance:

For stain resistance, the modified BASF Australia Ltd method "BALTM048" was used. Test paints were drawn down onto black PVC scrub panels (from the Leneta company) at a wet film thickness (WFT) of 125 μm. The samples were allowed to cure at 23° C. for 24 h. Then, another 125 μm WFT film was drawn down over the first, thereby obtaining a two coat test sample. After the second coat had been applied, the samples were allowed to cure again for 7 days at 23° C.

Three standard liquid stains, i.e. Artline red stamp ink, Parker Quink blue pen ink and a 10% w/w solution of instant coffee, as well as mustard and red wine were tested. Liquid stains were applied to the coating in a band approximately 1 to 2 cm wide in amounts of approximately 1 ml per stain. The crayon and lipstick were applied in bands about 1-2 cm wide. Each panel was stained in one area with each stain, although two separate stain panels were tested of each paint sample. The stains were then allowed to stand on the coating for 5 minutes, prior to being briefly rinsed to remove excess stain. The panels were then placed on a scrub tester. A sponge, Oates Clean type cut to fit a Sheen scrub tester block, was saturated with 50 ml of a 1% m/m Teric® N9 solution. This was then used to wash the test panel 200 times. To ensure the sponge was moist throughout the washing test, a dropping funnel delivered 4 drops per minute of the Teric N9 solution to one end of the stain panel. After this cleaning, the panels are briefly rinsed again and allowed to dry for 24 hours at 23° C. The results are given in table 1 as DE-values The "DE" is the total colour difference between an unstained and washed section of the panel and the stained and washed area as measured by a DataColor Spectrophotometer. Three points are read per panel for each stain and the washed section. The result for each stain is the average of two panels.

TABLE 1

Viscosity of paints and DE values after stain test.
Note a difference of 10% is considered significant

| Paint | Dispersion | KU[1] | ICI[2] [poise] | Red ink | Blue ink | Coffee |
|---|---|---|---|---|---|---|
| 1a (comp) | CP | 98 | 0.9 | 16.6 | 3.0 | 8.7 |
| 1b (comp) | CP+ | 98 | 0.7 | 18.6 | 3.3 | 5.2 |
| 1c (comp) | C1 | 70 | 0.6 | 19.5 | 3.4 | 6.2 |
| 2 | C2 | 90 | 0.7 | 13.1 | 2.7 | 4.9 |
| 3 | C3 | 92 | 0.7 | 13.7 | 2.0 | 4.7 |
| 4 | C4 | 99 | 1.0 | 11.1 | 0.6 | 3.3 |
| 4b | C5 | 90 | 0.9 | 18.0 | 1.4 | 3.9 |
| 4C | C6 | 134 | 1.0 | 19.4 | 2.35 | 3.78 |
| 5 (comp) | CD1 | 98 | 1.1 | 17.2 | 1.5 | 8.4 |
| 6 | D1 | 112 | 1 | 14.6 | 1.3 | 4.8 |
| 7 | D2 | 110 | 1.1 | 14.3 | 1.8 | 7.7 |
| 8 | D3 | 129 | 1.0 | 10.7 | 1.4 | 3.4 |
| 9 | D4 | 108 | 0.9 | 13.5 | 1.9 | 7.8 |
| 10 | D5 | 131 | 0.9 | 10.4 | 1.3 | 3.5 |
| 11 | D6 | 127 | 1.0 | 12.7 | 2.7 | 3.6 |
| 12 | D7 | 129 | 1.0 | 9.0 | 1.7 | 3.0 |

[1] Krebs Stormer Viscositiy in Krebs Units (KU)
[2] ICI viscosity in Poise
* comparative III.2 Wash Resistance Wash resistance testing was carried out over single draw downs of the test paints, with a 1% Teric N9 solution and the same type of sponge as used previously. Test paints were drawn down onto black PVC scrub panels (Lineta Company, USA) at a wet film thickness (WFT) of 125 μm. The samples were allowed to cure at 23° C. for 7 d. Then, gloss at 60° and 85° angle was determined using a BYK gloss meter, taking an average of 3 readings along the panel. Then, wash tests were carried out by placing the panels on a scrub tester. A sponge, the same type as that used in the stain test, previously soaked in 50 ml of a 1% m/m Teric® N9 solution (as used in the stain test) was then allowed to wash the test panel 200 times. Gloss was again determined at 60° and 85°, although only the 85° results are quoted here as they are the most significant. The results given in table 2 are the averagi of 3 gloss readings of the panels.

TABLE 2

| | Gloss Values (85° readings) | | | |
|---|---|---|---|---|
| Paint | Dispersion | 85° start | Δ[1] | Finish |
| 1a (comp) | CP | 11.8 | 1.6 | 13.4 |
| 1b (comp) | CP+ | 10.3 | 12.4 | 2.1 |
| 1c (comp) | C1 | 11.5 | 1.7 | 13.2 |
| 2 | C2 | 10.5 | 3.5 | 14 |
| 3 | C3 | 11.3 | 0.1 | 11.2 |
| 4 | C4 | 6.0 | 5.4 | 11.4 |
| 4b | C5 | 12.3 | 3.8 | 16.1 |
| 4C | C6 | 9.3 | 1.9 | 11.2 |
| 5 (comp) | CD1 | 10.0 | 1.7 | 11.7 |
| 6 | D1 | 9.7 | 4.8 | 14.6 |
| 7 | D2 | 10.1 | 1.7 | 11.7 |
| 8 | D3 | 10.4 | 3.4 | 13.8 |
| 9 | D4 | 9.7 | 1.8 | 11.6 |
| 10 | D5 | 10.1 | 3.6 | 13.7 |
| 11 | D6 | 10.7 | 2.9 | 13.6 |
| 12 | D7 | 10.3 | 3.2 | 13.5 |

[1] difference between gloss before and after washing;
comp: comparative

III.3 Stain Penetration

Stain penetration provides an indication if the stain is penetrating into the paint film or being repelled at the surface. Good stain penetration resistance is critical for high stain resistance. Test paints were drawn down onto glass panels at a wet film thickness (WFT) of 125 μm. These panels were allowed to cure for 7 days at 23° C. before being tested. The panels were stained in a single location only, with red wine, red ink, blue ink and coffee, which were allowed to sit on the paint films for 15 minutes. After 15 minutes, the panels were rinsed briefly with water and allowed to dry for 24 hours. Observations were then made about how deep the stains had penetrated into the paint films by viewing the stains from the other side of the glass panels, with the stained side placed over a neutral white background. The following rating was applied:

| Rating | Description |
|---|---|
| 0 | Stain not visible |
| 1 | Stain very faintly visible |
| 2 | Stain faintly visible |
| 3 | Stain clearly visible |
| 4 | Stain very strong but not penetrated to glass |
| 5 | Stain penetrated to glass |

| Paint | Dispersion | Red ink | Red wine | Blue ink | Coffee |
|---|---|---|---|---|---|
| 1b (comp) | CP+ | na | 4 | 4 | 3 |
| 1c (comp) | C1 | 5 | 3 | 3 | 4 |
| 2 | C2 | 5 | 3 | 3 | 3 |
| 3 | C3 | 5 | 2 | 2 | 2 |
| 4 | C4 | 4 | 1 | 1 | 2 |
| 4b | C5 | 4 | 0 | 1 | 1 |
| 4C | C6 | 4 | 0 | 1 | 1 |
| 6 | D1 | 3 | 0 | 1 | 1 |

Results show that reducing the level of EO rather than the level of surfactant as well as increasing the alkyl chain length has given an improvement in stain resistance and stain penetration resistance, without affecting wash resistance.

The invention claimed is:

1. A method for making an aqueous coating composition, which confers stain and penetration resistance when applied to a substrate and dried and/or cured, comprising mixing together at least one pigment, at least one film-forming polymer in the form of an aqueous polymer dispersion, and at least one anionic surfactant of formula (Ia), to obtain the aqueous coating composition;
   wherein said aqueous coating composition comprises:
   at least one pigment, an aqueous polymer dispersion containing at least one film-forming polymer, and at least one anionic surfactant (S) of formula (Ia);
   wherein the at least one film-forming polymer, in polymerized form, consists of:

(M1a) 40 to 59.4% by weight of methyl methacrylate or a mixture thereof with styrene,
(M1b) 40 to 55% by weight of at least one $C_2$-$C_{10}$ alkyl ester of acrylic acid,
(M2) 0.1 to 3% by weight of itaconic acid, acrylic acid, methacrylic acid, or a mixture thereof,
(M3a) 0.5 to 3% by weight of acrylamide, methacrylamide, hydroxyethyl acrylate, or a mixture thereof, and
(M3b) 0 to 2% by weight of N-(2-methacryloxyethyl) imidazolin-2-one,
provided that a total amount of (M1a), (M1b), (M2), (M3a), and (M3b) is 100% by weight and a total amount of (M2), (M3a), and (M3b) is from 0.7 to 5% by weight, based on the total amount of (M1a), (M1b), (M2), (M3a), and (M3b); and
wherein the at least one surfactant (S) is of formula (Ia):

$$M_{3-n}[O_{4-n}P\text{—}(O\text{-}(Alk\text{-}O)_m R)_n]$$ (Ia), wherein
n is 1 or 2,
m is an integer from 0 to 15,
M is hydrogen, an alkali metal ion, or an ammonium ion,
Alk is $C_2$-$C_3$-alkylene, and
R is $C_8$-$C_{30}$ alkyl or $C_4$-$C_{30}$ alkylphenyl;
wherein a weight ratio of the at least one pigment to the at least one film-forming polymer ranges from 4:1 to 1:5; and
wherein the amount of the at least one surfactant (S) of formula (Ia) constitutes at least 85% of the total amount by weight of anionic surfactants in the aqueous coating composition.

2. The method of claim 1, further comprising:
applying the aqueous coating composition to a surface of a substrate to give a coated substrate; and
curing the coated substrate to form a cured coating on the substrate; and
wherein red wine that is left static on a cured coating produced from a 125 μm wet film thickness of the aqueous coating composition on a glass substrate after curing for 7 days at 23° C. does not penetrate the cured coating to the substrate.

3. The method of claim 1, wherein the aqueous coating has a pigment volume concentration (pvc) of at least 20%.

4. The method of claim 1, wherein in the aqueous coating composition
M in formula (Ia) is different from hydrogen, and
the groups Alk-O comprise at least 50% by weight of groups of formula $CH_2CH_2O$ based on a total weight of the groups Alk-O.

5. The method of claim 1, wherein in the aqueous coating composition R in formula (Ia) is $C_{14}$-$C_{24}$ alkyl.

6. A method for providing stain and penetration resistance to a substrate comprising applying an aqueous coating composition to said substrate and drying and/or curing the aqueous coating composition;
wherein said aqueous coating composition comprises:
at least one pigment, an aqueous polymer dispersion containing at least one film-forming polymer, and at least one anionic surfactant (S) of formula (Ia);
wherein the at least one film-forming polymer, in polymerized form, consists of:
(M1a) 40 to 59.4% by weight of methyl methacrylate or a mixture thereof with styrene,
(M1b) 40 to 55% by weight of at least one $C_2$-$C_{10}$ alkyl ester of acrylic acid
(M2) 0.1 to 3% by weight of itaconic acid, acrylic acid, methacrylic acid, or a mixture thereof,
(M3a) 0.5 to 3% by weight of acrylamide, methacrylamide, hydroxyethyl acrylate, or a mixture thereof, and
(M3b) 0 to 2% by weight of N-(2-methacryloxyethyl) imidazolin-2-one
provided that a total amount of (M1a), (M1b), (M2), (M3a), and (M3b) is 100% by weight and a total amount of (M2), (M3a), and (M3b) is from 0.7 to 5% by weight, based on the total amount of (M1a), (M1b), (M2), (M3a), and (M3b); and
wherein the at least one surfactant (S) is of formula (Ia):

$$M_{3-n}[O_{4-n}P\text{—}(O\text{-}(Alk\text{-}O)_m R)_n]$$ (Ia), wherein
n is 1 or 2,
m is an integer from 0 to 15,
M is hydrogen, an alkali metal ion, or an ammonium ion,
Alk is $C_2$-$C_3$-alkylene, and
R is $C_8$-$C_{30}$ alkyl or $C_4$-$C_{30}$ alkylphenyl;
wherein a weight ratio of the at least one pigment to the at least one film-forming polymer ranges from 4:1 to 1:5; and
wherein the amount of the at least one surfactant (S) of formula (Ia) constitutes at least 85% of the total amount by weight of anionic surfactants in the aqueous coating composition.

7. The method of claim 6, wherein the aqueous coating composition has a pigment volume concentration (pvc) of at least 20%.

8. The method of claim 6, wherein in the aqueous coating composition
M in formula (Ia) is different from hydrogen, and
the groups Alk-O comprise at least 50% by weight of groups of formula $CH_2CH_2O$ based on a total weight of the groups Alk-O.

9. The method of claim 6, wherein in the aqueous coating composition R in formula (Ia) is $C_{14}$-$C_{24}$ alkyl.

* * * * *